Patented Mar. 25, 1924.

1,487,961

UNITED STATES PATENT OFFICE.

JOHN F. MAKOWSKI, OF STOCKTON, CALIFORNIA, ASSIGNOR TO CALIFORNIA CEDAR PRODUCTS COMPANY, OF STOCKTON, CALIFORNIA, A CORPORATION.

FORMULA FOR INSOLUBLE WALL TINTS.

No Drawing. Application filed December 23, 1922. Serial No. 608,596.

*To all whom it may concern:*

Be it known that I, JOHN F. MAKOWSKI, a citizen of the United States, residing at Stockton, county of San Joaquin, State of California, have invented certain new and useful Improvements in Formula for Insoluble Wall Tints; and I do declare the following to be a full, clear, and exact description of the same.

This invention relates to improvements in wall-tinting compositions, the principal object being to provide a composition for the purpose which when applied and allowed to dry will then be insoluble in water.

Another object is to form a tinting composition of such ingredients that very delicate coloring pigments may be used without the danger of them being burnt out.

The ingredients used in preparing the formula are casein, china clay or the like, lime or borax, and a coloring pigment.

The borax and lime have the same function in the composition, the former, while more expensive than the lime, being used when very delicate colors are desired which the presence of lime would cause to be burnt out.

When casein, lime and china clay are used, the proportions thereof are about as follows: Casein, ½ pound, lime, 1 pound, china clay, 10 pounds. If borax is used in place of lime, the proportions are substantially 1 pound of casein, ½ pound borax, and 10 pounds china clay, sufficient water, preferably hot, being added as usual, when the composition is to be applied to a wall, to enable the tint to be put on with a brush and to cover a considerable area.

The coloring pigment is of course added in a quantity depending on the depth of the color desired.

In either case, the casein is the adhesive and imparts the insoluble properties to the composition.

The lime or borax is the temporary solvent for the casein, a chemical action between the two resulting in said insolubility being permanently had upon the initial addition of the water, the addition of further water after the tint, is once dried, having no effect.

The china clay or the like gives the necessary body to the composition.

When applied to a wall and allowed to dry, it will be found that the above composition forms a tint which will not readily rub off, owing to the adhesive qualities of the casein, and cannot be washed off with water, owing to the then insoluble feature formed by the combination of the casein and lime or borax.

It will be understood of course that I do not wish to confine myself to the exact proportions of the ingredients as given above, these being approximations only.

Having thus described my invention, what I claim as new and useful and desire to secure by Letters Patent is;

1. A composition for wall tints comprising china clay, casein and borax.

2. A composition for wall tints consisting of a body material, casein, and borax, in substantially the proportions of 10 pounds of said body material, 1 pound of casein, and ½ pound of borax.

In testimony whereof I affix my signature.

JOHN F. MAKOWSKI.